United States Patent
Von Elm et al.

(10) Patent No.: US 9,312,657 B1
(45) Date of Patent: Apr. 12, 2016

(54) SOLID-STATE LASER WITH PRISMATIC GAIN-ELEMENT

(71) Applicant: Coherent LaserSystems GmbH & Co. KG, Göttingen (DE)

(72) Inventors: Rüdiger Von Elm, Wielen (DE); Wolf Seelert, Lübeck (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 0 days.

(21) Appl. No.: 14/558,549

(22) Filed: Dec. 2, 2014

(51) Int. Cl.
| | |
|---|---|
| H01S 3/08 | (2006.01) |
| H01S 3/115 | (2006.01) |
| H01S 3/06 | (2006.01) |
| H01S 3/10 | (2006.01) |
| H01S 3/16 | (2006.01) |
| H01S 3/0941 | (2006.01) |
| H01S 3/081 | (2006.01) |
| H01S 3/107 | (2006.01) |
| H01S 3/11 | (2006.01) |

(52) U.S. Cl.
CPC .............. *H01S 3/115* (2013.01); *H01S 3/0602* (2013.01); *H01S 3/0606* (2013.01); *H01S 3/0617* (2013.01); *H01S 3/0815* (2013.01); *H01S 3/0941* (2013.01); *H01S 3/10061* (2013.01); *H01S 3/1075* (2013.01); *H01S 3/1103* (2013.01); *H01S 3/1611* (2013.01); *H01S 3/1671* (2013.01); *H01S 3/1673* (2013.01); *H01S 3/1698* (2013.01)

(58) Field of Classification Search
CPC ... H01S 3/0606; H01S 3/0815; H01S 3/1075; H01S 3/1103; H01S 3/115
See application file for complete search history.

(56) References Cited

U.S. PATENT DOCUMENTS

| | | | |
|---|---|---|---|
| 5,249,196 A | 9/1993 | Scheps | |
| 5,905,748 A * | 5/1999 | Xie | 372/22 |
| 6,373,866 B1 | 4/2002 | Black | |
| 6,418,154 B1 | 7/2002 | Kneip et al. | |
| 8,837,535 B2 | 9/2014 | Spiekermann et al. | |
| 2006/0171018 A1* | 8/2006 | Galvanauskas et al. | 359/333 |
| 2013/0188663 A1 | 7/2013 | Pang | |

* cited by examiner

*Primary Examiner* — Tod T Van Roy
(74) *Attorney, Agent, or Firm* — Morrison & Foerster LLP

(57) ABSTRACT

A Q-switched solid-state laser has a neodymium-doped yttrium vanadate single-crystal gain-element in the form of a prism. The prism incorporates the functions of a gain-element, a polarizer, a resonator end-mirror and an output coupler.

18 Claims, 3 Drawing Sheets

SOLID-STATE LASER WITH PRISMATIC GAIN-ELEMENT

TECHNICAL FIELD OF THE INVENTION

The present invention relates in general to diode-pumped, solid-state lasers. The invention relates in particular to miniaturized, diode-pumped, actively Q-switched, solid-state lasers.

DISCUSSION OF BACKGROUND ART

It is recognized that applications of diode-pumped Q-switched solid-state lasers can be expanded by reducing the size and cost of such lasers. Reduced cost, of course, can provide that a new application can be made cost effective. Reduced size is beneficial for integration of the laser with other components required for an application.

All actively Q-switched solid-state lasers include a solid-state gain-element (crystal) in the form of a rod or disk, an acousto-optic (AO) or electro-optic (EO) Q-switching element, a polarizing element, a maximally reflecting mirror, and a partially transmitting (out-coupling) mirror. The maximally reflecting and partially transmitting mirrors form a laser-resonator (resonant cavity). These mirrors are usually referred to by practitioners of the art as end-mirrors. Additional mirrors may be required to "fold" the laser-resonator for minimizing the "footprint" of the laser.

As the pulse width of a Q-switched laser scales directly with laser-resonator length, various approaches have been taken to reducing the resonator-length of such lasers, such as coating one of the end mirrors on the gain-element. It is believed that further resonator-length reductions would require a significantly different approach to the design of actively Q-switched, diode-pumped solid-state lasers.

SUMMARY OF THE INVENTION

In one aspect, laser apparatus in accordance with the present invention comprises a gain-element in the form of a rare-earth-doped, prismatic, birefringent crystal having first, second, third faces parallel to the optic-axis (c-axis) of the crystal and at an angle to each other. The gain-element has polarization-dependent gain strongest in the optic-axis direction. A source of pump-radiation is provided for energizing the gain-element, thereby causing the gain-element to emit laser-radiation at the fundamental wavelength and plane-polarized in the c-axis direction of the gain-element. A laser-resonator for the c-axis polarized fundamental-wavelength radiation is formed between a first end-mirror, and either a coating on the third face of the prism highly reflective at a fundamental emission wavelength of the crystal, or a second end-mirror spaced apart from the third face of the prism. A polarization-rotator is located in the resonator and arranged to selectively rotate the polarization of radiation making a double-pass therethrough. When the polarization is rotated by the polarization-rotator at a non-orthogonal angle to the c-axis direction, the radiation is resolved into a c-axis polarized component and an a-axis polarized component polarized perpendicular to the c-axis direction, with the c-axis polarized radiation circulating in the laser-resonator and the a-axis component of the radiation being transmitted through the second face of the gain-element as output radiation

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figures 1, 1A, 1B:
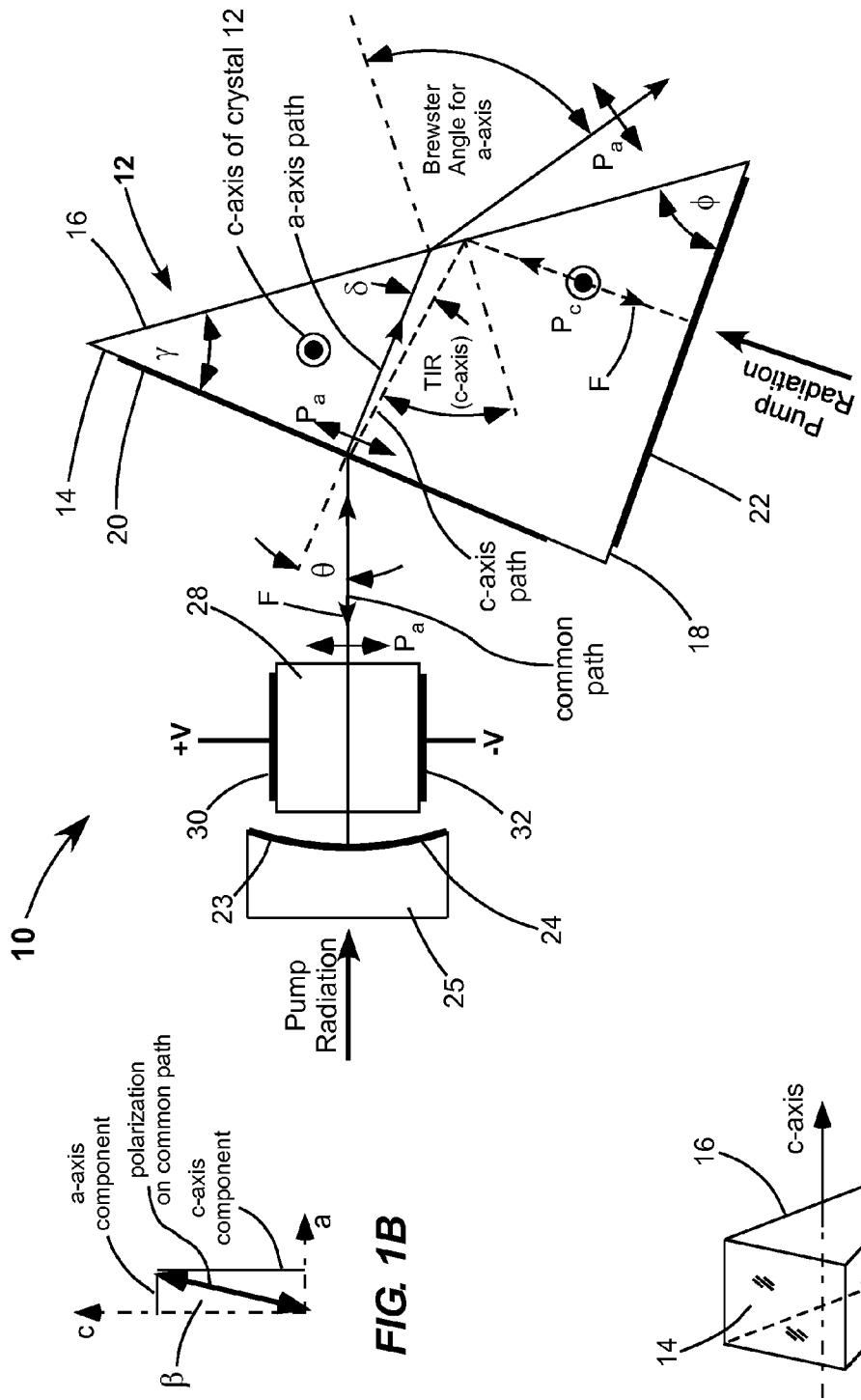
FIG. 1 schematically illustrates one preferred embodiment of a Q-switched solid-state laser in accordance with the present invention including a neodymium-doped yttrium vanadate crystal in the form of a prism having first, second, and third faces all parallel to the crystal c-axis, with a laser-resonator including an electro-optic polarization rotator and terminated by the concave mirror and a maximally reflective coating on the third face of the prism, with the first face of the prism providing a path separator for orthogonally oriented polarization-orientations, and with the second face of the prism functioning as a resonator fold-mirror and an out-coupling mirror depending on the polarization-orientation of radiation incident thereon.
FIG. 1A is a three-dimensional view schematically illustrating further detail of the prismatic neodymium-doped yttrium vanadate crystal of FIG. 1.
FIG. 1B schematically illustrates radiation circulating in the laser resonator resolved at the first face of the crystal into a c-axis polarized component and an a-axis component polarized perpendicular to the c-axis.

Turning now to the drawings, FIG. 1 and FIG. 1A schematically illustrate a preferred embodiment 10 of a Q-switched solid-state laser in accordance with the present invention. A critical element of laser 10 is a neodymium-doped yttrium vanadate (Nd:YVO$_4$) single-domain crystal prism 12, which provides a gain-element, polarizer and an output coupler in a single component for laser 10. The prism should preferably be defect-free, and should not contain any bubbles or striations.

Prism 12 has three faces 14, 16, and 18 inclined to each other, with all about parallel to the c-axis (optical-axis) of the prism (see, in particular, FIG. 1A). Some deviation from exact parallelism is tolerable, for example ± about 1 degree (1°). The c-axis of the prism is perpendicular to the plane of the drawing. A YVO$_4$ crystal is a uniaxial, highly birefringent crystal, with the a-axis and b-axis (of the a, b, c Cartesian axis system) having the same refractive index, different from the refractive index in the c-axis. For purposes of this description, prism 12 can be considered as having two a-axes perpendicular to each other and perpendicular to the c-axis, such that a-axis refractive index, effectively, is rotationally symmetric about the c-axis, perpendicular thereto, i.e., in the plane of the drawing. At a 1064 nanometer (nm) peak-gain wavelength of the Nd:YVO$_4$ crystal, the c-axis refractive index ($n_c$) is 2.165 and the a-axis refractive index ($n_a$) is 1.957.

It is assumed, here, that the prism (gain-element) is optically pumped with diode-laser radiation at a wavelength of about 808 nm. The pump-radiation is preferably plane polarized parallel to the c-axis of crystal 12. This arrangement provides a peak-absorption for pump-radiation. Other well-known pump-radiation wavelengths for Nd:YVO$_4$ may be used without departing from the spirit and scope of the present invention.

On face 18 of prism 12 is a coating 22 which is maximally reflective at the 1064 nm peak-gain wavelength, and highly transmissive at the 808 nm pump-radiation wavelength, here for normal incidence. On face 14 of prism 12 is an antireflection coating with reflectivity minimized for the 1064 nm wavelength and the 808 nm wavelength, for radiation plane-polarized parallel to the c-axis and at an angle of incidence θ which is preferably about 15°. Reflectivity at the 1064 nm wavelength is preferably less than about 0.1%. Reflectivity at the 808 nm wavelength is preferably less than about 0.5%. The coatings preferably have a damage threshold greater than about ten Joules per square centimeter (10 J/cm$^2$) for a pulse-duration of ten nanoseconds (10 ns). Face 16 of prism 12 is left uncoated.

A laser-resonator 30 for radiation plane polarized parallel to the c-axis of prism 12 is formed between reflector 22 and a mirror coating 23, deposited on a concave surface 24 of a transparent substrate 25. The polarization direction is indicated by arrowhead P$_c$. This polarization is perpendicular to the plane of incidence of radiation on the prism faces (s-polarization). The path of the c-axis polarized radiation in the resonator is "folded" by refraction at face 14 of prism 12 and total internal reflection (TIR) at face 16 of the prism. The path of c-axis polarized radiation inside crystal 12 is indicated by a dashed line. In the resonator outside of crystal 12, the c-axis polarized radiation is on a common path with a-axis polarized radiation. The a-axis polarization direction is indicated by arrows P$_a$, in the plane of the drawing and perpendicular to the a-axis path. C-axis polarized fundamental radiation circulates in the resonator as indicted by arrows F.

Located in resonator 30 is a birefringent crystal 28 for providing polarization-rotation dependent on the length of the crystal and a switching-voltage applied across the crystal. Electrodes 30 and 32 are provided for applying the voltage, here, indicated as +V on electrode 30 and −V on electrode 32 as would be the case if the voltage were supplied from a power supply push-pull amplifier.

A preferred material for crystal 28 is rubidium titanyl phosphate (RTP). For a RTP crystal having a length of about 6 millimeters (mm), a potential difference of about 600 Volts (V) would be required to provide polarization-rotation of 90°. It should be noted, here, that only sufficient detail of crystal 32 and the manner of applying voltage thereto is provided for understanding operating principles of the present invention. Details of configuring birefringent crystals for rotating polarization, and power supplies for applying switching-voltage thereto, are well-known in the art, and are not required for understanding operating principles of the present invention. A preferred mode of operation of laser 10 is set forth below, continuing with reference to FIG. 1.

Optical pump-radiation is delivered continuously to crystal 12. The pump-radiation may be delivered into the crystal directly through mirror 22, or indirectly through mirror 23 and polarization rotating crystal 28. Arrangements for focusing pump-radiation in a gain-element are well known in the art and are not shown in FIG. 1, for simplicity of illustration.

The primary gain-direction in crystal 12 is in the c-axis, and fundamental-wavelength radiation from the crystal in response to the pumping will be emitted through face 14 of the crystal along the common path for a-axis and c-axis polarized radiation. The fundamental wavelength radiation will be plane-polarized substantially in the c-axis direction. Crystal 28 is configured such that, with no voltage applied thereto, the polarization-orientation of fundamental-wavelength radiation making a forward and reverse pass through crystal 28 is rotated by net 90° and will, accordingly, be polarized substantially in the a-axis direction on returning to prism 12, i.e., parallel to the plane of incidence on radiation on the prism faces.

At face 14 of prism 12 the a-axis polarized radiation is refracted along an a-axis path to face 16 of the prism, at angle δ to the c-axis path. In a case where radiation were normally incident on face 14, angles θ and δ would both be zero. In this case the angle of incidence on the second surface is chosen to provide total internal reflection for the c-axis polarized radiation, i.e., 27.51° (for Nd:YVO$_4$). The a-axis polarized radiation sees for this angle at nearly Brewsters angle which is 27.06° (for Nd:YVO$_4$). This results for the 27.51° angle of incidence in greater 99% transmission for a-axis polarized radiation. Operation of the inventive laser with angle θ at zero degrees is practical albeit not ideal.

For an exemplary incidence angle θ of 15°, angle δ will be about 0.74° and TIR for c-axis polarized and 100% transmission for a-polarized light can be realized. That is to say, angle γ between faces 14 and 16 of prism 12 is selected, cooperative with incidence angle θ, such the a-axis path in the crystal in incident on face 16 at the internal Brewster angle for the a-axis refractive index and the c-axis path is incident at an angle large enough to provide TIR on face 16 of the prism for the c-axis path. Angle φ between faces 16 and 18 of the prism is selected such that the totally internally reflected c-axis path is normally incident on face 18. For the exemplary incidence angle θ of 15°, angle γ will be about 35.5°, and angle φ will be about 28.5°.

Figure 2:
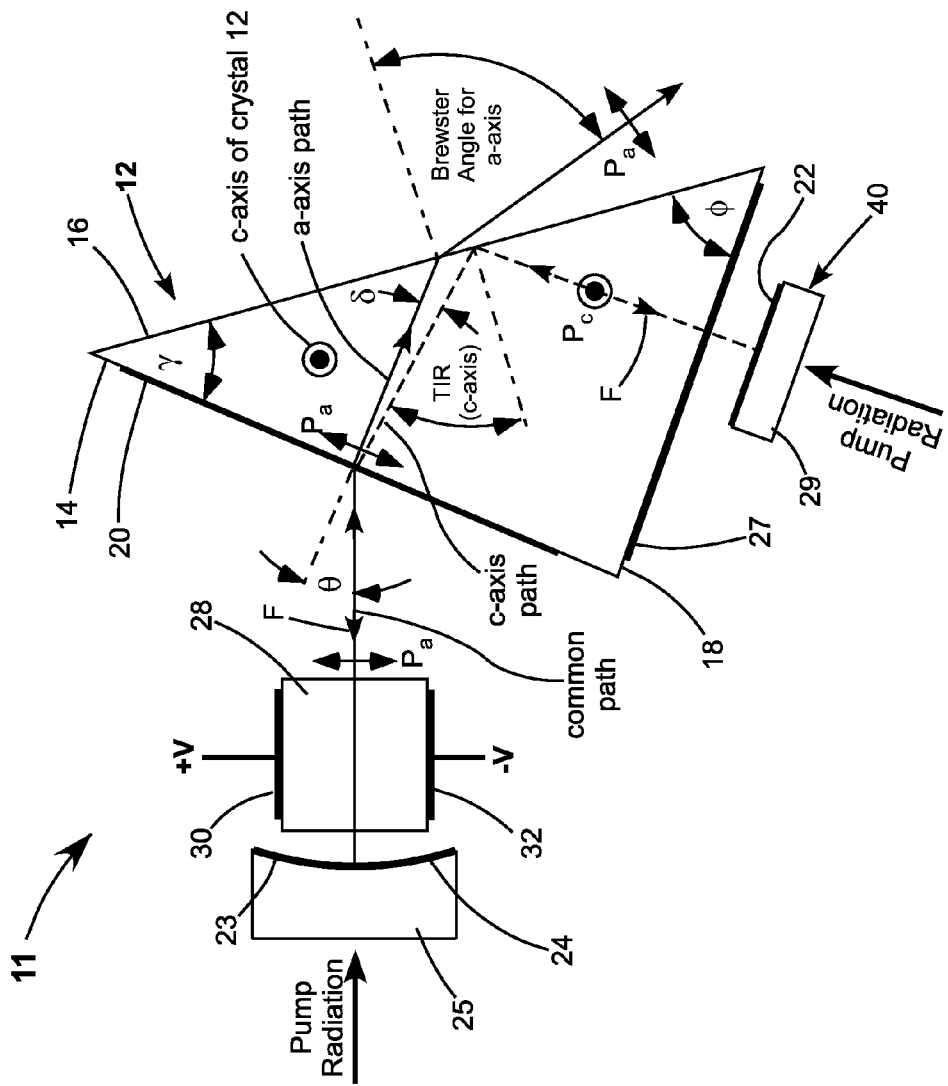
FIG. 2 schematically illustrates one preferred embodiment of a Q-switched solid-state laser in accordance with the present invention, similar to the embodiment of FIG. 1 but where in third face of the prism has an anti-reflection coating thereon and the laser-resonator is terminated by the concave mirror and a maximally reflective coating on a substrate spaced apart from the third face of the prism.
Figure 3A:
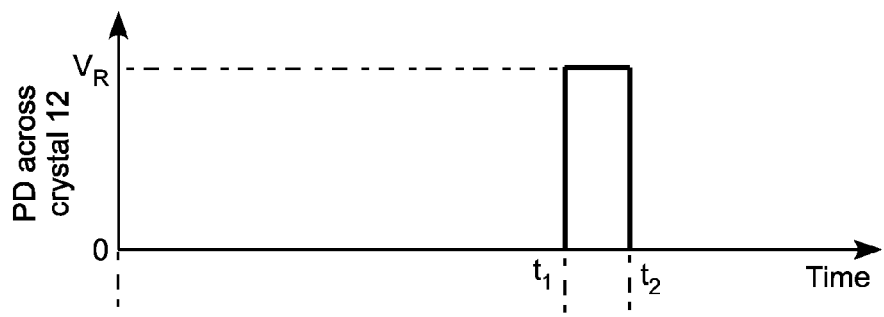
FIG. 3A, FIG. 3B, and FIG. 3C provide a timing diagram of respectively voltage across the polarization rotator, resonator loss, and laser output as a function of time in one operating mode of the laser of FIG. 1.
Figure 3B:
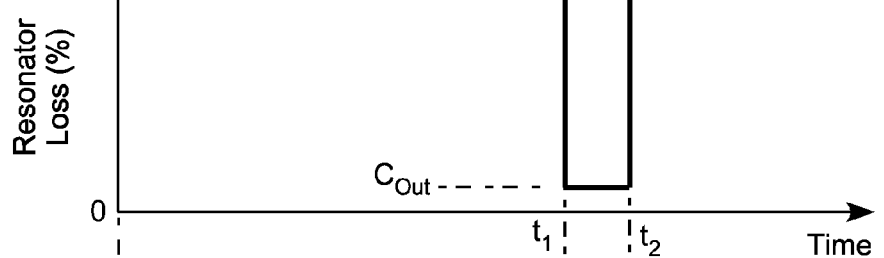
Figure 3C:
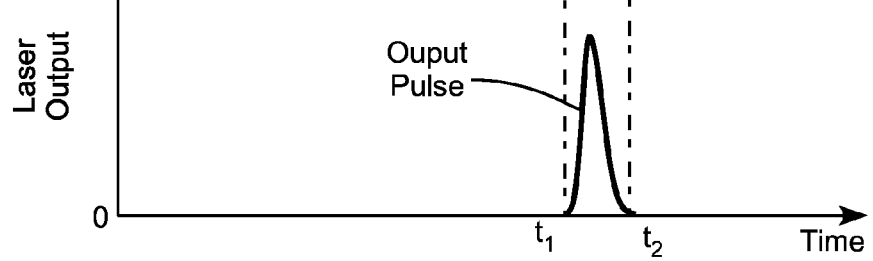

It should be noted here that while the inventive laser resonator is described and depicted in FIG. 1 as being formed between (terminated by) end-mirror 23 and coating 22 on face 18 of prism 12, a functional resonator could be formed by end mirror 23 and a separate end-mirror spaced apart from face 18 of prism 12. This is depicted in FIG. 2 as laser 11, in which the highly reflective coating 22 on face 18 of prism 12 in laser 10 of FIG. 1 is replaced by an antireflection coating 27 for the fundamental emission wavelength. A separate end mirror 40, spaced-apart from face 18 is provided by incorporating highly reflective coating 22 (at the fundamental emission wavelength) on a substrate 29. Consistent with a goal of minimizing resonator-length, the spacing between mirror 40 and face 18 should be minimized to an extent practical.

Continuing with reference again to FIG. 1, and with reference in addition to FIG. 1B, FIG. 3A, FIG. 3B, and FIG. 3C, with no voltage across crystal 28 (see FIG. 3A) almost 100 percent of the radiation emitted by crystal 28 will return from crystal 28, follow the a-axis path through crystal 12 and be transmitted through face 16 of crystal 12. This will constitute almost 100% loss for resonator 30 (see FIG. 3B) and there will be no laser power output (see FIG. 3C) apart some negligible amount of fluorescence. Crystal 12 (gain-element 12) will accumulate gain while there is no output.

At a time $t_1$ when an output pulse is required, the voltage across crystal 28 is switched to a value $V_R$ (see FIG. 3A) sufficient to rotate the c-axis polarization radiation making a double pass through the crystal by almost, but not exactly, net zero or net 180°. This is depicted in FIG. 1B wherein angle β is the angle of deviation from exact zero or 180-degree rotation, and wherein crystal axes a and c are depicted by dashed lines. This will result in radiation returning to crystal 12 being resolved into a c-axis polarized component, which will propagate along the c-axis path in the crystal and a smaller a-axis polarized component, which will travel along the a-axis path in the crystal and be transmitted through face 16 of the crystal as laser output. The percentage of laser radiation transmitted is the output coupling percentage $C_{Out}$ (see FIG. 3B). There will be laser action (resonance) in resonator 30, which will release the accumulated gain in crystal 12 as an output pulse (see FIG. 3C). At a time $t_2$, when the pulse has been released, the voltage across crystal 28 is switched back to zero, laser action ceases, and gain accumulates in crystal 12 in preparation for the delivery of another pulse.

It will be evident from the above description that the deviation angle from exact c-axis polarization alignment (net zero or net 180°) of radiation returning to prism 12 determines the output coupling percentage of laser 10. An optimum output coupling percentage can readily be determined experimentally (without knowing what the actual percentage is) by varying the switching (polarization-rotating) voltage $V_R$ while measuring output pulses.

Those skilled in the art to which the present invention pertains will recognize that laser 10 could be operated by putting the laser in the non-lasing condition by applying a high voltage across crystal 28 to keep the laser in the non-lasing condition, then switch to a lower (or zero) voltage to deliver a pulse from the laser. This, of course is much less efficient than the preferred operating method described above.

Those skilled in the art will also recognize that while the present invention is described above as including a Nd:YVO$_4$ prismatic gain-element, the prismatic gain-element could be of some other highly birefringent crystal material with strongly polarization-dependent gain. Examples of other suitable materials are gadolinium vanadate (Gd:YVO$_4$), and neodymium-doped yttrium gadolinium vanadate (Nd:Gd$_x$Y$_{1-x}$VO$_4$) and neodymium-doped Lutetium Vanadate (Nd:LuYVO$_4$).

A particular advantage of the inventive laser is that because of the path separation of the circulating c-axis polarized radiation and delivered a-axis polarization, the delivered radiation has a high degree of polarization linearity. A polarization contrast ratio greater than 100 is readily achievable. The prismatic gain-element combines the functions of a polarizer and an output coupler. This provides for a relatively short resonator, for example, less than about 6 mm long, which enables generation of pulses having a duration significantly less than 1 nanosecond (ns). Gain can be concentrated in the middle of the resonator (by pumping through mirror 23) or at the end (by pumping through mirror 22) to reduce spatial hole-burning and optimize pulse-to-pulse stability. Those skilled in the art will recognize, from the description provided above, other features and advantages of laser 10 without departing from the spirit and scope of the present invention.

In the invention described above the length of an actively Q-switched laser resonator is minimized by employing a single component (prism) incorporating the functions of a gain-element, a polarizer, a resonator end-mirror and a resonator output coupler. The invention is described with reference to a preferred and other embodiments. The invention is not limited however to the embodiments described and depicted herein. Rather, the invention is limited only by the claims appended hereto.

What is claimed is:

1. Laser apparatus, comprising:
   a gain-element in the form of a rare-earth-doped, prismatic, birefringent crystal having first, second, third faces parallel to the c-axis of the crystal and at an angle to each other, the gain-element having polarization-dependent gain strongest in the c-axis direction;
   a source of pump-radiation for energizing the gain-element, thereby causing the gain-element to emit laser-radiation at the fundamental wavelength and plane-polarized in the c-axis direction of the gain-element;
   a laser-resonator for the c-axis polarized fundamental-wavelength radiation, the resonator formed between a first end-mirror, and one of (1) a coating on the third face of the prism highly reflective at the fundamental emission wavelength of the crystal, and (2) a second end-mirror spaced apart from the third face of the prism;
   a polarization-rotator located in the resonator and arranged to selectively rotate the polarization of radiation making a double-pass therethrough; and
   wherein when the polarization is rotated by the polarization-rotator at a non-orthogonal angle to the c-axis direction, the radiation is resolved into a c-axis polarized component and an a-axis polarized component polarized perpendicular to the c-axis direction, with the c-axis polarized radiation circulating in the laser-resonator and the a-axis component of the radiation being transmitted through the second face of the gain-element as output radiation wherein the polarization-resolved radiation is non-normally incident on the first face of the prism and the c-axis polarized component and the a-axis polarized component follow separate paths in the crystal at an angle to each other.

2. The apparatus of claim 1, wherein the incidence angle of the polarization-resolved radiation on the first face of the prism and the angle between the first and second faces of the prism is selected such that the path of the a-axis polarized component is incident on the second face of the prism at the Brewster angle for the crystal material, and the path of the c-axis polarized component is incident on the crystal such that total internal reflection (TIR) of the c-axis polarized component occurs.

3. The apparatus of claim 2, wherein resonator is formed between the first end-mirror, and a coating on the third face of the prism highly reflective at the fundamental emission wavelength of the crystal, and wherein the angle between the second and third faces of the prism is selected such that the path of c-axis radiation reflected from the second face of the prism is normally incident on the third face of the prism.

4. The apparatus of claim 3, wherein the highly reflective coating on the third face of the prism is also highly transmissive for the pump-radiation, and the pump-radiation is delivered to the prism through the third face thereof.

5. The apparatus of claim 2, wherein resonator is formed between the first end-mirror, and, and a second end-mirror spaced apart from the third face of the prism, and wherein the third face of the prism is antireflection coated for the fundamental emission wavelength.

6. The apparatus of claim 5, wherein the second end-mirror is highly transmissive for the pump-radiation, and the pump-radiation is delivered to the prism through the second end-mirror.

7. The apparatus of claim 3, wherein the first end-mirror is highly transmissive for the pump-radiation, and the pump-radiation is delivered to the prism through the first end-mirror and the polarization rotator.

8. The apparatus of claim 1, wherein the polarization rotator is an electro-optic polarization rotator.

9. The apparatus of claim 1, wherein the polarization rotator includes an RTP crystal.

10. The apparatus of claim 1, wherein the first face of the prism is anti-reflection coated for the fundamental emission wavelength.

11. The apparatus of claim 1, wherein the second face of the prism is uncoated.

12. The apparatus of claim 1, wherein the gain-element crystal is a crystal of a neodymium-doped vanadate material.

13. The apparatus of claim 12, wherein the neodymium-doped vanadate material is one of neodymium-doped yttrium vanadate, neodymium-doped gadolinium vanadate, neodymium-doped yttrium gadolinium vanadate, and neodymium-doped lutetium vanadate.

14. The apparatus of claim 13, wherein the neodymium-doped vanadate material is neodymium-doped yttrium vanadate.

15. A Q-switched laser comprising:
a laser resonator defined by first and second end mirrors;
a birefringent gain medium located within the resonator formed in the shape of a prism having three sides;
a source of optical radiation for exciting the gain medium to generate optical radiation having a polarization state; and
a polarization rotator located within the resonator, said rotator being operable between a first state where the polarization state of the radiation is rotated a first amount and a second state wherein the polarization state of the radiation is rotated a second amount, wherein when said rotator is operating in the first state, gain builds up in the laser resonator and when the rotator is operated in the second state, a laser pulse is generated that exits one of the sides of the gain medium and wherein the gain medium is arranged such that when the rotator is in the first state, the majority of the generated radiation exits said one side of the gain medium resulting in a loss that prevents lasing and wherein when the rotator is in the second state, the majority of the radiation is totally internally reflected at said one side of the gain medium and the remainder of the radiation exits said one side as a laser pulse.

16. A laser as recited in claim 15, wherein the first amount of polarization rotation is about 90 degrees and the second amount of polarization rotation is close to but less than 180 degrees.

17. A laser as recited in claim 15, wherein one of said end mirrors is defined by a coating applied to another of said sides of said gain medium.

18. A laser as recited in claim 15, wherein both said first and second end mirrors are spaced from the gain medium.

* * * * *